(12) United States Patent
Senff

(10) Patent No.: US 9,617,384 B2
(45) Date of Patent: Apr. 11, 2017

(54) CORE-SHELL POLYAMIDE POWDER

(75) Inventor: Holger Senff, Lescar (FR)

(73) Assignee: Arkema France, Colombes (FR)

( * ) Notice: Subject to any disclaimer, the term of this patent is extended or adjusted under 35 U.S.C. 154(b) by 795 days.

(21) Appl. No.: 12/521,089

(22) PCT Filed: Dec. 26, 2007

(86) PCT No.: PCT/FR2007/052621
§ 371 (c)(1),
(2), (4) Date: Dec. 14, 2009

(87) PCT Pub. No.: WO2008/087358
PCT Pub. Date: Jul. 24, 2008

(65) Prior Publication Data
US 2010/0098880 A1 Apr. 22, 2010

(30) Foreign Application Priority Data

Dec. 28, 2006 (FR) ...................... 06 56029

(51) Int. Cl.
| | | |
|---|---|---|
| *B05D 3/00* | (2006.01) | |
| *C08G 69/00* | (2006.01) | |
| *C08G 69/18* | (2006.01) | |
| *C08L 77/02* | (2006.01) | |
| *B29C 67/00* | (2017.01) | |
| *B29K 77/00* | (2006.01) | |

(52) U.S. Cl.
CPC .............. *C08G 69/18* (2013.01); *C08L 77/02* (2013.01); *B29C 67/0081* (2013.01); *B29K 2077/00* (2013.01)

(58) Field of Classification Search
None
See application file for complete search history.

(56) References Cited

U.S. PATENT DOCUMENTS

| | | |
|---|---|---|
| 4,334,056 A | 6/1982 | Meyer et al. |
| 4,694,063 A | 9/1987 | Hilaire et al. |
| 4,831,061 A * | 5/1989 | Hilaire et al. ................. 521/56 |
| 6,245,281 B1 * | 6/2001 | Scholten et al. .............. 264/497 |
| 7,468,405 B2 | 12/2008 | Allen et al. |
| 2004/0138344 A1 * | 7/2004 | Allen et al. .................... 523/326 |
| 2005/0197446 A1 | 9/2005 | Loyen et al. |

OTHER PUBLICATIONS

Ghosh et al. (Melt Rheology of Segment Polyamides: Effect of Block Molecular weight, J. of Appl. Poly. Sci., vol. 71, 1739-1747 (1999)).*
Shinto Fine (Development of Spherical Polyamide Fine Powder, R&D Report, "Sumitomo Kagaku", vol. 2006-1, published May 31, 2006) (available at http://www.sumitomo-chem.co.jp/english/rd/report/theses/2006-1.html).*
Plastic Material Data Sheets—Typical Properties of Nylon—Metric Units. MattWeb—Division of Automation Creation., Inc. (2004)—Nylon 6, 12.*
Plastic Material Data Sheets—Typical Properties of Nylon—Metric Units. MattWeb—Division of Automation Creation., Inc. (2004)—Nylon 6, Nylon 6,6.*
Plastic Material Data Sheets—Typical Properties of Nylon—Metric Units. MattWeb—Division of Automation Creation., Inc. (2004)—Nylon 12.*

* cited by examiner

*Primary Examiner* — Alexandre Ferre
(74) *Attorney, Agent, or Firm* — Millen, White, Zelano and Branigan, P.C.

(57) ABSTRACT

The invention relates to a seeded particle of polyamide (PA) powder composed of a shell made of PA-6, PA-12 or PA-6/12 and of a core made from PA-6, paA-11, PA-12 or PA-6/12, PA 6,12, PA-6,6, PA-8 or PA-4, the core and the shell being either of identical polyamide nature but of different molecular weight, or of different polyamide nature. The particle for which the shell has a melting temperature Tf1 and a crystallization temperature Tc1 and for which the core has a melting temperature Tf2 and a crystallization temperature Tc2, is characterized in that the difference in absolute value between Tf1−Tc1 and/or between Tf2−Tc2 is greater than the difference in absolute values between the melting temperature and the crystallization temperature of a particle of powder seeded by a mineral filler and for which the shell is made of PA6, PA12 or PA6/12.

12 Claims, No Drawings

US 9,617,384 B2

CORE-SHELL POLYAMIDE POWDER

This application claims benefit, under U.S.C. §119 or §365 of FR 0656029 filed Dec. 28, 2006; and PCT application PCT/FR2007/052621 filed Dec. 26, 2007.

The present invention relates to a process for preparing a new polyamide 12, polyamide 6 or polyamide 6/12 powder seeded with an organic filler, this powder having a lower crystallization temperature than the same powder seeded with an inorganic filler. The process is an anionic synthesis from lactam. The powders obtained have an average diameter of between 8 μm and 100 μm. These polyamide powders are useful in particular in the technology of sintering polyamide powders by melting induced by radiation such as, for example, a laser beam (laser sintering), infrared radiation or UV radiation (UV curing), in the field of cosmetic compositions of else in composites.

The technology of sintering polyamide powders under a laser beam is used to manufacture three-dimensional articles such as prototypes and models. A thin layer of polyamide powder is deposited on a horizontal plate maintained in a chamber heated at a temperature between the crystallization temperature (Tc) and the melting temperature (Tf) of the polyamide powder. The laser sinters powder particles at different points of the powder layer according to a geometry corresponding to the article, with the aid, for example, of a computer having the shape of the article in its memory and reproducing this shape in the form of slices. Subsequently the horizontal plate is lowered by a value corresponding to the thickness of one powder layer (for example, between 0.05 and 2 mm and generally of the order of 0.1 mm) and then a new powder layer is deposited and the laser sinters powder particles according to a geometry corresponding to this new slice of the article, and so on. The procedure is repeated until the entire article has been produced. The result at the outcome of the process is a block of powder containing the article inside, the parts which have not been sintered remaining in the powder state. Next the assembly is gently cooled and the article solidifies when its temperature falls below the crystallization temperature (Tc). Following complete cooling, the article is separated from the powder, which can be used again for a further operation.

It is advisable for the powder to have a difference Tf–Tc which is as great as possible, in order to avoid the phenomena of deformation (or "curling") during production. The reason for this is that at time $t_0$, i.e., immediately after the action of the laser beam, the temperature of the sample is greater than the crystallization temperature (Tc) of the powder, but the addition of a new, colder layer of powder causes the temperature of the component to fall rapidly below (Tc) and gives rise to deformations.

Furthermore, as high as possible an enthalpy of fusion (ΔHf) is required in order to obtain good geometric definition of the components produced.

It is clear that everything which has just been explained with regard to the sintering of polyamide powders under a laser beam is valid irrespective of the specific radiation that induces melting.

U.S. Pat. No. 6,245,281 describes the use of polyamide 12 (PA 12) powders in the technology of laser beam powder sintering. These powders are such that their Tf is between 185 and 189° C., their Tc is between 138 and 143° C., and their ΔHf is 112±17 J/g. These powders are produced by the process described in patent DE 2906647 (=U.S. Pat. No. 4,334,056). In the latter patent, PA 12 is first produced and then dissolved in ethanol between 130 and 150° C. before being gently cooled below 125° C., with stirring, and the PA 12 is precipitated in powder form.

A new seeded polyamide powder has now been found whose powder particles are composed of a shell of PA6, PA12 or PA6/12 and of a core of PA6, PA11, PA12, PA6/12, PA6,12, PA6,6, PA8 or PA4. The use of this powder in a sintering technology defined above is particularly advantageous since the powder has an increased difference Tf–Tc, as an absolute value, in relation to the customary powders. The powder particle may have a shell and a core of the same PA type but with different molecular masses M: shell and core of PA6, shell and core of PA12, shell and core of PA6/12, or may have a shell and a core of different PA type. In this case there is, for example:

- a shell of PA6 and a core selected from PA11, PA12, PA6/12, PA6,12, PA6,6, PA8, and PA4,
- a shell of PA12 and a core selected from PA6 PA11, PA6/12, PA6,12, PA6,6, PA8, and PA4, and
- a shell of PA6/12 and a core selected from PA6, PA11, PA12, PA6,12, PA6,6, PA8, and PA4.

The present invention relates to a new powder, its use, and a process for preparing it by anionic polymerization of a monomer of lauryllactam, of caprolactam or of a mixture thereof in solution in a solvent for said lactam or said mixture and in the presence of seeds which are PA6, PA11, PA12, PA6/12, PA6,12, PA6,6, PA8, and PA4 powder particles, said polymerization being performed in the presence:

- of a catalyst,
- of an activator,
- of a filler, said filler being particles of finely divided PA12, PA11, PA6, PA6/12, PA6,12, PA6,6, PA8 or PA4 powder, the [organic filler/monomer or monomers introduced into the reaction medium] weight ratio being defined later on below,
- of an amide of formula R1—NH—CO—R2 in which R1 may be replaced by a radical R3-CO—NH— or R3-O— and in which R1, R2, and R3 denote an aryl, alkyl or cycloalkyl radical, the proportion of this compound being between 0.001 mol and 0.1 mol per 1000 g of monomers.

at a polymerization temperature >70° C. and <150° C.

The seeded powder obtained at the end of the polymerization is insoluble in the solvent for the lactam introduced beforehand into the reaction medium. The term "seeding" is used when the thickness of the polymer layer of the eventual seeded powder particle is greater than the radius of the filler, and, conversely, the term "coating" is used when the thickness of the polymer layer of the eventual coated particle is less than the radius of the filler.

The invention provides a seeded polyamide (PA) powder particle composed of a shell of polyamide and a core of polyamide, the core and the shell being either of identical polyamide type but of different molecular mass, or of different polyamide type.

In one embodiment the seeded polyamide (PA) powder particle is characterized in that the shell is of PA6, PA12 or PA6/12 and the core is of PA6, PA11, PA12, PA6/12, PA6,12, PA6,6, PA8 or PA4, the core and the shell being either of identical PA type but of different molecular mass, or of different PA type.

In one embodiment the particle whose shell has a melting temperature Tf1 and a crystallization temperature Tc1 and whose core has a melting temperature Tf2 and a crystallization temperature Tc2, characterized in that the difference in absolute value between Tf1–Tc1 and/or between Tf2–Tc2 is greater than the difference in absolute value between the melting temperature and the crystallization temperature of a powder particle seeded by an inorganic filler and having a shell of PA6, PA12 or PA6/12.

In one embodiment the powder particle is characterized in that it has a shell and a core of the same PA type, in other words shell and core of PA6, shell and core of PA12 or shell and core of PA6/12.

In one embodiment the particle is characterized in that it has a shell of PA6 and a core selected from PA11, PA12, PA6/12, PA6,12, PA6,6, PA8, and PA4.

In one embodiment the particle is characterized in that it has a shell of PA12 and a core selected from PA6, PA11, PA6/12, PA6,12, PA6,6, PA8, and PA4.

In one embodiment the particle is characterized in that it has a shell of PA6/12 and a core selected from PA6, PA11, PA12, PA6,12, PA6, 6, PA8, and PA4.

The invention likewise provides a process for preparing a powder particle by anionic polymerization in solution in a solvent, characterized in that said polymerization of lactam 6, of lactam 12 or of a mixture thereof is carried out in the presence of a catalyst, an activator, at least one amide selected from N,N'-alkylenebisamides, and an organic filler.

In one embodiment the process is characterized in that the organic filler is selected from PA6, PA11, PA12, PA6/12, PA6,12, PA6,6, PAR, and PA4.

In one embodiment the process is characterized in that the N,N'-alkylenebisamide is selected from EBS and EBO.

In one embodiment the process is characterized in that in addition to the N,N'-alkylenebisamide there is a further amide selected from oleamide, N-stearamide, isostearamide, and erucamide.

The invention also provides for the use of the powder in composites, substrate coatings, transfer papers or to manufacture cosmetic compositions.

In one embodiment the use of the powder to produce articles by sintering of said powder by melting induced by radiation selected from a laser beam, infrared radiation or UV radiation.

The invention likewise provides a method of producing an article by sintering of the powder, wherein:
  a. a thin layer of powder (layer 1) is placed on a horizontal plate held in a chamber heated at a temperature between the crystallization temperature (Tc) and the melting temperature (Tf) of said powder,
  b. a laser sinters the powder particles at different points of the powder layer (layer 1) according to a geometry corresponding to the article to be produced,
  c. the horizontal plate is lowered by a value corresponding to the thickness of one layer of powder and then a new layer of powder (layer 2) is deposited,
  d. the laser sinters the powder particles of the powder layer (layer 2) according to a geometry corresponding to this new slice of the article to be produced,
  e. the horizontal plate is lowered by a value corresponding to the thickness of one layer of powder and then a new layer of powder is deposited,
  f. the laser sinters the powder particles of the powder layer according to a geometry corresponding to this new slice of the article to be produced,
  g. the above steps are repeated until the article is finished;
  h. the temperature is lowered gradually to below the crystallization temperature (Tc).

After complete cooling, the article is separated from the powder, which can be used again for a further operation.

The Ingredients of the Polymerization

An anionic polymerization conducted in order to produce PA particles is performed in a solvent.

The Solvent

The solvent used dissolves the monomer but not the polymer particles which form during the polymerization. Examples of solvent are given in patent EP192515. Advantageously the solvent is a paraffinic hydrocarbon fraction whose boiling range is between 120 and 170° C., preferably between 140 and 170° C.

The solvent may be supersaturated with monomer at the initiation temperature, i.e., at the temperature at which the polymerization commences. There are different means of supersaturating the solvent with monomer. One of these means may involve saturating the solvent with monomer at a temperature higher than the initiation temperature, and then lowering the temperature to the initiation temperature. Another means may involve substantially saturating the solvent with monomer at the initiation temperature and then adding, at the same temperature, a primary amide containing preferably 12 to 22 carbon atoms, such as, for example, oleamide, N-stearamide, erucamide or isostearamide, or else an N,N'-alkylenebisamide, examples of which are given later on below.

It is also possible to perform the polymerization in a solvent which is not supersaturated with monomer. In that case the reaction mixture contains the monomer in solution in the solvent at a concentration far from that of supersaturation at the initiation temperature.

The Catalyst

A catalyst is used which is selected from the customary catalysts of the anionic polymerization of lactams. It is a base which is sufficiently strong to give a lactamate after reaction with the lactam. A combination of two or more catalysts may be contemplated. Nonlimiting examples include sodium hydride, potassium hydride, sodium, and sodium methoxide and/or ethoxide. The amount of catalyst(s) introduced may in general vary between 0.5 and 3 moles per 100 moles of monomer.

The Activator

An activator is added as well, its role being that of stimulating and/or accelerating the polymerization. The activator is selected from lactam N-carboxyanilides, (mono) isocyanates, polyisocyanates, carbodiimides, cyanamides, acyllactams and acylcarbamates, triazines, ureas, N-substituted imides, esters, and phosphorus trichloride. It may optionally also be a mixture of two or more activators. The activator may also optionally be formed in situ, for example, by reaction of an alkyl isocyanate with the lactam to give an acyllactam.

The molar catalyst/activator ratio is between 0.2 and 2, preferably between 0.8 and 1.2.

The Amide

At least one amide is also added, one of which is always an N,N'-alkylenebisamide as indicated in EP192515. The amount of N,N'-alkylenebisamide(s) introduced is generally of the order of 0.001 to 4 moles, preferably of 0.075 to 2 moles, per 100 moles of monomer. Particularly recommended N,N'-alkylenebisamides include the N,N'-alkylenebisamides of fatty acids, and more preferably:
  % N,N'-Ethylenebisstearamide of formula $C_{17}H_{35}$—C(=O)—NH—$CH_2CH_2$—NH—C(=O)—$C_{17}H_{35}$, abbreviated EBS.
  % N,N'-Ethylenebisoleamide of formula $C_{17}H_{33}$—C(=O)—NH—$CH_2CH_2$—NH—C(=O)—$C_{17}H_{33}$, abbreviated EBO.

% N,N'-Alkylenebis-palmitamide, -gadoleamide, -cetoleamide, and -erucamide.

Preference is given to using EBS and/or EBO.

It is also possible to add a primary amide containing preferably 12 to 22 carbon atoms. It may be selected from the following: oleamide, N-stearamide, iso-stearamide, erucamide.

The Organic Filler

The organic filler comprises homo- or copolyamide polyamide powders, preferably of PA12, PA11, PA6, PA6/12, PA 6,12, PA 6,6, PA8, PA4 (for example, Orgasol® powders from Arkema, Vestosint® powders from Degussa, MICROPAN® powder from Chemopharma, etc.).

The amount of organic filler and the diameter of said fillers make it possible to influence in the desired direction (small particles or large particles) the size of the eventual particles obtained at the end of the polymerization.

The Other Fillers or Additives

It is also possible to add to the reaction mixture any type of fillers (pigments, dyes, carbon black, carbon nanotubes, etc.) or additives (antioxidants, anti-UV agents, plasticizers, etc.) on condition that all of these compounds are thoroughly dry and inert with respect to the reaction mixture.

The Polymerization

The anionic polymerization is carried out continuously or else, preferably, discontinuously (batchwise). The discontinuous regime involves introducing the solvent and then, simultaneously or in succession, the monomer or monomers, optionally an N,N'-alkylenebisamide, the filler, the catalyst, and the activator. It is advisable first to introduce the solvent and the monomer or monomers and then to remove any trace of water, by means for example of an azeotropic distillation, and then to add the catalyst when the mixture is anhydrous. The filler may be introduced, for example, after the introduction of the monomer or monomers. It may be advantageous, in order to prevent solidification or loss of control of the polymerization, to introduce the activator not in one go but instead in portions or else at a given rate of introduction.

Operation takes place at atmospheric pressure or else under a slightly higher pressure (partial pressure of the hot solvent) and at a temperature between 20° C. and the boiling temperature of the solvent. The temperature of initiation and of polymerization of the lactams is generally between and 150° C., preferably between 80 and 130° C., and advantageously <120° C. and >90° C.

The [organic filler/monomer or monomers introduced into the reaction mixture] weight ratio, expressed in %, is between 0.001% and 65%, preferably between 0.005% and 45%, more preferably between 0.01% and 30%, and advantageously between 0.05% and 20%.

The powders according to the invention can be used in the context of the method of producing articles by melting induced by a laser beam (laser sintering), IR radiation or UV radiation. The technique of laser sintering is described in the applicant's patent application EP1571173.

THE EXAMPLES

We are now going to give examples of the invention (see tables 1 and 2 below).

Measurement of the Particle Size of the Powders Obtained

The powders obtained in the inventive and comparative examples below are analyzed using a Coulter LS230 granulometer. It allows the particle-size distribution of the powders to be obtained, from which it is possible to determine:
% The average diameter.
% The breadth of the distribution or the standard deviation of the distribution.

The particle-size distribution of the powders according to the invention is determined by the customary techniques, using a Coulter LS230 granulometer from Beckman-Coulter. From the particle-size distribution it is possible to ascertain the volume-average diameter with the logarithmic calculation mode, version 2.11a. of the software, and also the standard deviation, which measures the narrowness of the distribution or the breadth of the distribution around the average diameter. One of the advantages of the process described here is that it allows a narrow distribution (low standard deviation) to be obtained in relation to the average diameter. This standard deviation is calculated using the logarithmic statistical calculation mode, version 2.11a. of the software.

Measurement of the Thermal Characteristics by DSC

The powders are analyzed in accordance with the standard ISO 11357-3 "Plastics—Differential scanning calorimetry (DSC) Part 3: Determination of temperature and enthalpy of melting and crystallization."

In the examples below, particularly with regard to the DSC, the melting temperature indicated by "Tf" corresponds to the first heating or melting temperature Tf1.

Measurement of the Solution Viscosity

The solution viscosity is measured at 0.5% by mass in m-cresol at 20° C. Since the solution viscosity is related to the molecular mass, the viscosity is a means of expressing the molecular mass.

EXAMPLES

Tables 1 and 2 Below

Comparative Example 1

PA6/12+Silica

The reactor, maintained under nitrogen, is charged with 2800 ml of solvent and then, in succession, with 108 g of caprolactam, 791 g of dry lauryllactam, 14.4 g of EBS, and 12.6 g of finely divided AEROSIL® R972 (silica). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 7.2 g of sodium hydride at 60% purity in oil are introduced rapidly under nitrogen, and the stirring is increased to 720 rpm, under nitrogen at 110° C. for 30 minutes.

Subsequently the temperature is taken to 96° C. and, using a small metering pump, the selected activator, namely stearyl isocyanate (32.9 g made up to 314 g with the solvent), is injected continuously into the reaction mixture in accordance with the following program:
% 10 g/h of isocyanate solution for 300 minutes;
% 88 g/h of isocyanate solution for 180 minutes;

In parallel the temperature is maintained at 96° C. for the first 360 minutes and then is raised to 110° C. over 60 minutes and held at 110° C. for a further 2 hours after the end of introduction of the isocyanate. The polymerization is then at an end and the reactor is almost clean.

After cooling to 80° C., decanting, and drying, the particle size is between 1 and 40 μm, with an average particle diameter of 9.9 μm, a standard deviation of 1.54, and an ASSA of 16.8 m²/g without agglomerates. The first melting point is 163° C. and the solution viscosity is 0.84 dl/g.

Inventive Example 2

PA6/12 Seeded with PA12

The reactor, maintained under nitrogen, is charged with 2800 ml of solvent and then, in succession, with 108 g of caprolactam, 679 g of dry lauryllactam, 14.4 g of EBS, and 112 g of finely divided ORGASOL® 2001 UD NAT1 (PA12 powder 5 µm in diameter). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 7.2 g of sodium hydride at 60% purity in oil are introduced rapidly under nitrogen, and the stirring is increased to 720 rpm, under nitrogen at 110° C. for 30 minutes.

Subsequently the temperature is taken to 96° C. and, using a small metering pump, the selected activator, namely stearyl isocyanate (32.9 g made up to 314 g with the solvent), is injected continuously into the reaction mixture in accordance with the following program:
  % 10 g/h of isocyanate solution for 300 minutes;
  % 88 g/h of isocyanate solution for 180 minutes;

In parallel the temperature is maintained at 96° C. for the first 360 minutes and then is raised to 110° C. over 60 minutes and held at 110° C. for a further 2 hours after the end of introduction of the isocyanate.

The polymerization is at an end and the reactor is almost clean. After cooling to 80° C., decanting, and drying, the particle size is between 3 and 35 µm, with an average particle diameter of 11.8 µm, a standard deviation of 1.27, and an ASSA of 9.3 m²/g without agglomerates. The shell and core melting temperatures are 161.5° C. and 173.7° C. respectively.

Comparative Example 3

PA6/12+Silica

The reactor, maintained under nitrogen, is charged with 2800 ml of solvent and then, in succession, with 108 g of caprolactam, 791 g of dry lauryllactam, 24.7 g of EBS, and 16.2 g of finely divided AEROSIL® R972 (silica). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 7.2 g of sodium hydride at 60% purity in oil are introduced rapidly under nitrogen, and the stirring is increased to 720 rpm, under nitrogen at 110° C. for 30 minutes.

Subsequently the temperature is taken to 105° C. and, using a small metering pump, the selected activator, namely stearyl isocyanate (32.9 g made up to 324 g with the solvent), is injected continuously into the reaction mixture in accordance with the following program:
  % 53.9 g/h of isocyanate solution for 360 minutes;

In parallel the temperature is maintained at 105° C. for the 360 minutes of injection and then is raised to 110° C. over 60 minutes and held at 110° C. for a further 3 hours after the end of introduction of the isocyanate.

The polymerization is at an end and the reactor is almost clean. After cooling to 80° C., decanting, and drying, the particle size is between 2 and 70 µm, with an average particle diameter of 23.8 µm and a standard deviation of 1.65 without agglomerates.

Inventive Example 4

PA6/12 Seeded with PA12

The reactor, maintained under nitrogen, is charged with 2800 ml of solvent and then, in succession, with 108 g of caprolactam, 791 g of dry lauryllactam, 12.6 g of EBS, and 18.7 g of finely divided ORGASOL® 2001 UD NAT1 (PA12 powder 5 µm in diameter). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 5.4 g of sodium hydride at 60% purity in oil are introduced rapidly under nitrogen, and the stirring is increased to 720 rpm, under nitrogen at 110° C. for 30 minutes.

Subsequently the temperature is taken to 96° C. and, using a small metering pump, the selected activator, namely stearyl isocyanate (16.45 g made up to 324 g with the solvent), is injected continuously into the reaction mixture in accordance with the following program:
  % 53.9 g/h of isocyanate solution for 360 minutes;

In parallel the temperature is maintained at 96° C. for 360 minutes during injection and then is raised to 110° C. over 60 minutes and held at 110° C. for a further 3 hours after the end of introduction of the isocyanate.

The polymerization is at an end and the reactor is almost clean. After cooling to 80° C., decanting, and drying, the particle size is between 1 and 40 µm, with an average particle diameter of 18.8 µm, the solution viscosity is 0.91 dl/g, and Tf1=166.9° C. and Tc1=109.2° C.

Inventive Example 5

PA6 Seeded with PA12

The reactor, maintained under nitrogen, is charged with 2800 ml of solvent and then, in succession, with 899 g of caprolactam, 7.2 g of EBS, and 54 g of ORGASOL® 2001 EXD NAT1. After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 5.8 g of sodium hydride at 60% purity in oil are introduced rapidly under nitrogen, and the stirring is increased to 550 rpm, under nitrogen at 110° C. for 30 minutes.

Subsequently the temperature is taken to 120° C. and this temperature is maintained for 60 minutes. Using a small metering pump, the selected activator, namely stearyl isocyanate (37.3 g made up to 66.3 g with the solvent), is injected continuously into the reaction mixture in accordance with the following program:
  % 41 g/h of isocyanate solution for 95 minutes.

In parallel the temperature is maintained at 120° C. for the first 215 minutes.

The polymerization is at an end and the reactor is almost clean. After cooling to 80° C., decanting, and drying, the particle size is between 10 and 80 μm, with an average particle diameter of 31 μm.

DSC analysis shows Tf=171° C., Tf=216° C., Tc=144° C., and Tc=176° C.

Inventive Example 6

PA6 Seeded with PA6

The reactor, maintained under nitrogen, is charged with 2800 ml of solvent and then, in succession, with 899 g of caprolactam, 7.2 g of EBS, and 54 g of ORGASOL® 1002 D NAT1 (PA6 powder). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 5.8 g of sodium hydride at 60% purity in oil are introduced rapidly under nitrogen, and the stirring is increased to 550 rpm, under nitrogen at 110° C. for 30 minutes.

Subsequently the temperature is taken to 120° C. and this temperature is maintained for 60 minutes. Using a small metering pump, the selected activator, namely stearyl isocyanate (37.3 g made up to 66.3 g with the solvent), is injected continuously into the reaction mixture in accordance with the following program:

% 41 g/h of isocyanate solution for 95 minutes.

In parallel the temperature is maintained at 120° C. for the first 215 minutes.

The polymerization is at an end and the reactor is almost clean. After cooling to 80° C., decanting, and drying, the particle size is between 10 and 100 μm, with an average particle diameter of 45.8 μm. DSC analysis shows Tf=214° C. and Tc=172° C.

Comparative Example 7

PA6+Silica

The reactor, maintained under nitrogen, is charged with 2800 ml of solvent and then, in succession, with 899 g of caprolactam, 7.2 g of EBS, and 5.75 g of finely divided AEROSIL® 8972 (silica). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 5.8 g of sodium hydride at 60% purity in oil are introduced rapidly under nitrogen, and the stirring is increased to 550 rpm, under nitrogen at 110° C. for 30 minutes.

Subsequently the temperature is taken to 120° C. and this temperature is maintained for 60 minutes. Using a small metering pump, the selected activator, namely stearyl isocyanate (37.3 g made up to 66.3 g with the solvent), is injected continuously into the reaction mixture in accordance with the following program:

% 41 g/h of isocyanate solution for 95 minutes.

In parallel the temperature is maintained at 120° C. for the first 215 minutes.

The polymerization is at an end and the reactor is almost clean. After cooling to 80° C., decanting, and drying, the particle size is between 2 and 75 μm, with an average particle diameter of 23 μm. DSC analysis shows Tf=216° C. and Tc=179° C.

Comparative Example 8

PA12+Silica

The reactor, maintained under nitrogen, is charged with 2757 ml of solvent and then, in succession, with 899 g of lactam12, 7.2 g of EBS, and 7.5 g of Sipernat® 320DS silica. After the stirring has been commenced at 300 rpm, heating is carried out gradually to 105° C., and then 360 ml of solvent are distilled off under vacuum in order, azeotropically, to entrain any trace of water that might be present.

Following a return to atmospheric pressure, the anionic catalyst and 2.7 g of sodium hydride at 60% purity in oil are introduced rapidly under nitrogen, and the stirring is increased to 550 rpm, under nitrogen at 105° C. for 30 minutes.

Using a small metering pump, the selected activator, namely stearyl isocyanate (19.2 g made up to 220.5 g with the solvent), is injected continuously into the reaction mixture in accordance with the following program:

% 8 g/h of isocyanate solution for 180 minutes
% 26 g/h of isocyanate solution for 120 minutes
% 71 g/h of isocyanate solution for 120 minutes In parallel the temperature is maintained at 105° C. for 360 minutes during injection and then is raised to 110° C. over 30 minutes and held at 110° C. for 30 minutes and then is raised to 130 min in 30 min and maintained at 130 min for a further 3 hours after the end of introduction of the isocyanate.

The polymerization is at an end and the reactor is almost clean. After cooling to 80° C., decanting, and drying, the particle size is between 15 and 80 μm, with an average particle diameter of 36 μm. DSC analysis shows Tf=183° C. and Tc=138.2° C.

Inventive Example 9

PA12 Seeded with PA12

The reactor, maintained under nitrogen, is charged with 2757 ml of solvent and then, in succession, with 899 g of lactam12, 7.2 g of EBS, and 11.3 g of Orgasol® 2001 EXD NAT1 (PA12 powder). After the stirring has been commenced at 300 rpm, heating is carried out gradually to 105° C., and then 360 ml of solvent are distilled off under vacuum in order, azeotropically, to entrain any trace of water that might be present.

Following a return to atmospheric pressure, the anionic catalyst and 2.7 g of sodium hydride at 60% purity in oil are introduced rapidly under nitrogen, and the stirring is increased to 550 rpm, under nitrogen at 105° C. for 30 minutes.

Using a small metering pump, the selected activator, namely stearyl isocyanate (19.2 g made up to 220.5 g with the solvent), is injected continuously into the reaction mixture in accordance with the following program:

% 8 g/h of isocyanate solution for 180 minutes
% 26 g/h of isocyanate solution for 120 minutes
% 71 g/h of isocyanate solution for 120 minutes In parallel the temperature is maintained at 105° C. for 360 minutes during injection and then is raised to 110° C. over 30 minutes and held at 110° C. for 30 minutes and then is raised to 130 min in 30 min and maintained at 130 min for a further 3 hours after the end of introduction of the isocyanate.

The polymerization is at an end and the reactor is almost clean. After cooling to 80° C., decanting, and drying, the particle size is between 20 and 90 μm, with an average particle diameter of 50 μm. DSC analysis shows Tf=183.8° C. and Tc=134.7° C.

Inventive Example 10

PA12 Seeded with PA12

The reactor, maintained under nitrogen, is charged with 2757 ml of solvent and then, in succession, with 899 g of lactam12, 7.2 g of EBS, and 1.65 g of Orgasol® 2002 UD NAT1 (PA12 powder). After the stirring has been commenced at 300 rpm, heating is carried out gradually to 105° C., and then 360 ml of solvent are distilled off under vacuum in order, azeotropically, to entrain any trace of water that might be present.

Following a return to atmospheric pressure, the anionic catalyst and 2.7 g of sodium hydride at 60% purity in oil are introduced rapidly under nitrogen, and the stirring is increased to 550 rpm, under nitrogen at 105° C. for 30 minutes.

Using a small metering pump, the selected activator, namely stearyl isocyanate (19.2 g made up to 220.5 g with the solvent), is injected continuously into the reaction mixture in accordance with the following program:

% 8 g/h of isocyanate solution for 180 minutes
% 26 g/h of isocyanate solution for 120 minutes
% 71 g/h of isocyanate solution for 120 minutes In parallel the temperature is maintained at 105° C. for 360 minutes during injection and then is raised to 110° C. over 30 minutes and held at 110° C. for 30 minutes and then is raised to 130 min in 30 min and maintained at 130 min for a further 3 hours after the end of introduction of the isocyanate.

The polymerization is at an end and the reactor is almost clean. After cooling to 80° C., decanting, and drying, the particle size is between 20 and 90 μm, with an average particle diameter of 46 μm. DSC analysis shows Tf=183° C. and Tc=135.8° C.

Comparative Example 11

PA6/12+Silica

The reactor, maintained under nitrogen, is charged with 2800 ml of solvent and then, in succession, with 323 g of caprolactam, 575 g of lactam12, 30.9 g of EBS, and 10.8 g of finely divided AEROSIL® R972 (silica). After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 9 g of sodium hydride at 60% purity in oil are introduced rapidly under nitrogen, and the stirring is increased to 550 rpm, under nitrogen at 110° C. for 30 minutes.

Subsequently the temperature is taken to 81° C. and this temperature is maintained for 30 minutes. Using a small metering pump, the selected activator, namely stearyl isocyanate (32.4 g made up to 323.9 g with the solvent), is injected continuously into the reaction mixture in accordance with the following program:

% 53.9 g/h of isocyanate solution for 360 minutes.

In parallel the temperature is maintained at 81° C. during injection and then is raised to 110° C. over 60 minutes and held at 110° C. for a further 3 hours after the end of introduction of the isocyanate.

The polymerization is at an end and the reactor is almost clean. After cooling to 80° C., decanting, and drying, the particle size is between 2 and 30 μm, with an average particle diameter of 9.2 μm. DSC analysis shows Tf=142.4° C. and Tc=108.7° C.

Comparative Example 12

PA6/12 Seeded with PA6

The reactor, maintained under nitrogen, is charged with 2800 ml of solvent and then, in succession, with 323 g of caprolactam, 575 g of lactam12, 30.9 g of EBS, and 54 g of ORGASOL® 1002D NAT. After the stirring has been commenced at 300 rpm, heating is carried out gradually to 110° C., and then 290 ml of solvent are distilled off under vacuum in order, azeotropically, to entrain any trace of water that might be present.

Following a return to atmospheric pressure, the anionic catalyst and 9 g of sodium hydride at 60% purity in oil are introduced rapidly under nitrogen, and the stirring is increased to 550 rpm, under nitrogen at 110° C. for 30 minutes.

Subsequently the temperature is taken to 81° C. and this temperature is maintained for 30 minutes. Using a small metering pump, the selected activator, namely stearyl isocyanate (32.4 g made up to 323.9 g with the solvent) is injected continuously into the reaction mixture in accordance with the following program:

% 53.9 g/h of isocyanate solution for 360 minutes.

In parallel the temperature is maintained at 81° C. during injection and then is raised to 110° C. over 60 minutes and held at 110° C. for a further 3 hours after the end of introduction of the isocyanate.

The polymerization is at an end and the reactor is almost clean. After cooling to 80° C., decanting, and drying, the particle size is between 5 and 80 μm, with an average particle diameter of 31 μm. DSC analysis shows Tf=141.8° C., Tf=210.7° C. and Tc=92.9° C.

TABLE 1

| Example | Comp. 1 | Inv. 2 | Comp. 3 | Inv. 4 | Inv. 5 | Inv. 6 | Comp. 7 |
|---|---|---|---|---|---|---|---|
| Lactam6 (g) | 108 | 108 | 108 | 108 | 899 | 899 | 899 |
| Lactam12 (g) | 791 | 679 | 791 | 791 | / | | |
| EBS (g) | 14.4 | 14.4 | 12.6 | 12.6 | 7.2 | 7.2 | 7.2 |
| Inorganic filler (g) | 12.6 | | 16.2 | | | | 5.75 |
| Organic | | 112 | | 18.7 | 54 | 54 | |

TABLE 1-continued

| Example | Comp. 1 | Inv. 2 | Comp. 3 | Inv. 4 | Inv. 5 | Inv. 6 | Comp. 7 |
|---|---|---|---|---|---|---|---|
| filler (g) | | (PA12) | | (PA12) | (PA12) | (PA6) | |
| Stearyl isocyanate (g) | 32.9 | 32.9 | 32.9 | 16.54 | 37.3 | 37.3 | 37.3 |
| NaH (g) | 7.2 | 7.2 | 7.2 | 5.4 | 5.8 | 5.8 | 5.8 |
| Average diameter (μm) | 9.9 | 11.8 | 23.8 | 18.8 | 31 | 45.8 | 23.0 |
| Melting temperature (° C.) | 163 | 161.5*<br>173** | 162 | 166.9* | 216*<br>171** | 214 | 216 |
| Crystallization temperature (° C.) | | 118.8 | 121.1 | 109.2* | 176*<br>144** | 172 | 179 |
| \|Tf − Tc\| | | 43.3* | 40.9 | 57.6 | 40*<br>27** | 42 | 37 |

*in the shell of the PA particle
**in the core of the PA particle

TABLE 2

| Example | Comp. 8 | Inv. 9 | Inv. 10 | Comp. 11 | Inv. 12 |
|---|---|---|---|---|---|
| Lactam6 (g) | / | / | / | 323 | 323 |
| Lactam12 (g) | 899 | 899 | 899 | 575 | 575 |
| EBS (g) | 7.2 | 7.2 | 7.2 | 30.9 | 30.9 |
| Inorganic filler (g) | 7.5 | / | / | 10.8 | / |
| Organic filler (g) | / | 11.3 (PA12) | 1.65 (PA12) | / | 54 (PA6) |
| Stearyl isocyanate (g) | 19.2 | 19.2 | 19.2 | 32.4 | 32.4 |
| NaH (g) | 2.7 | 2.7 | 2.7 | 9 | 9 |
| Average diameter (μm) | 36 | 50 | 46 | 9.2 | 31 |
| Melting temperature Tf1 (° C.) | 183 | 183.8 | 183 | 142.4 | 141.8*<br>210.7** |
| Crystallization temperature (° C.) | 138.2 | 134.7 | 135.7 | 108.7 | 92.9* |
| \|Tf − Tc\| | 44.8 | 49.1 | 47.2 | 33.7 | 48.9 |
| Solution viscosity, organic filler | | 0.72 | 0.79 | | 0.72 |
| Solution viscosity, eventual powder | 1.35 | 1.32 | 1.33 | 0.65 | 0.64 |

*in the shell of the PA particle
**in the core of the PA particle

The invention claimed is:

1. A seeded polyamide (PA) powder particle comprising a shell of polyamide and a core of polyamide, the core and the shell being either of identical polyamide type but of different molecular mass, or of different polyamide type, wherein the seeded polyamide is obtained by polymerization of amide monomer in the presence of a polyamide seed, and the shell is PA6, PA12 or PA6/12 and the core is PA6, PA11, PA12, PA6/12, PA6,6, PA8 or PA4, and wherein said shell has a melting temperature Tf1 and a crystallization temperature Tc1 and said core has a melting temperature Tf2 and a crystallization temperature Tc2, Tf1, Tc1, Tf2 and Tc2 are such that the difference in absolute value between Tf1−Tc1 and/or between Tf2−Tc2 of said seeded polyamide powder is greater than the difference in absolute value between the melting temperature and the crystallization temperature of a powder particle seeded by silica and having a shell of PA6, PA12 or PA6/12.

2. The particle of claim 1, having a shell of PA6 and a core that is PA11, PA12, PA6/12, PA6,12, PA6,6, PA8, or PA4.

3. The particle of claim 1, having a shell of PA12 and a core that is PA6, PA11, PA6/12, PA6,12, PA6,6, PA8, or PA4.

4. The particle of claim 1, having a shell of PA6/12 and a core that is PA6, PA11, PA12, PA6,12, PA6,6, PA8, or PA4.

5. The particle of claim 1, comprising a shell of polyamide and a core of polyamide, the core and the shell being either of identical polyamide type but of different molecular mass, or of different polyamide type, wherein the shell consists of PA6, PA12 or PA6/12, and the core consists of PA6, PA11, PA12, PA6/12, PA6,12, PA6,6, PA8 or PA4.

6. The particle of claim 1, wherein the core consists of polyamide.

7. A process for preparing a powder particle comprising a shell of polyamide and a core of polyamide according to claim 1, the core and shell being of different polyamide type, comprising anionic polymerization in solution in a solvent, of lactam 6, of lactam 12 or of a mixture thereof, in the presence of a catalyst, an activator, at least one N,N'-alkylenebisamide, and an organic filler, wherein the organic filler is PA6, PA11, PA12, PA6/12, PA6,12, PA6,6, PA8 or PA4.

8. The process of claim 7, wherein the N,N'-alkylenebisamide is N,N'-Ethylenebisstearamide (EBS) or N,N'-Ethylenebisoleamide (EBO).

9. The process of claim 8, comprising the presence, in addition to the N,N'-alkylenebisamide, of an amide selected from the group consisting of oleamide, N-stear-amide, isostearamide, and erucamide.

10. A composite, substrate coating, transfer paper or cosmetic composition, comprising a particle of claim 1.

11. An article manufactured by sintering one or more of the particles of claim 1 by melting induced by radiation from a laser beam, infrared radiation or UV radiation.

12. A method of producing an article according to claim 11, by sintering of powder particles composed of a shell of polyamide and a core of polyamide, the core and shell being of different polyamide type, comprising
  a) placing a layer of powder (layer 1) on a horizontal plate held in a chamber heated to a temperature between the crystallization temperature (Tc) and the melting temperature (TO of said powder,
  b) sintering the powder particles at different points of the powder layer (layer 1) with a laser according to a geometry corresponding to the geometry at layer 1 of an article to be produced,
  c) lowering the horizontal plate by a value corresponding to the thickness of one layer of powder and then a new layer of powder (layer 2) is deposited,
  d) sintering the powder particles of the powder layer (layer 2) with the laser according to a geometry corresponding to the geometry at layer 2 of the article to be produced, e) lowering the horizontal plate by a value corresponding to the thickness of one layer of powder and then a new layer of powder is deposited,
f) sintering the powder particles of the powder layer with the laser according to a geometry corresponding to the geometry at the layer deposited in step e) of an article to be produced,
g) repeating the above steps e) and f) until the article is finished;
h) gradually lowering the temperature to below the crystallization temperature (Tc); and
i) separating, after complete cooling, the article from remaining powder.

* * * * *